June 10, 1930.  E. K. STANDISH  1,762,199
VARIABLE SPEED TRANSMISSION
Filed July 3, 1929
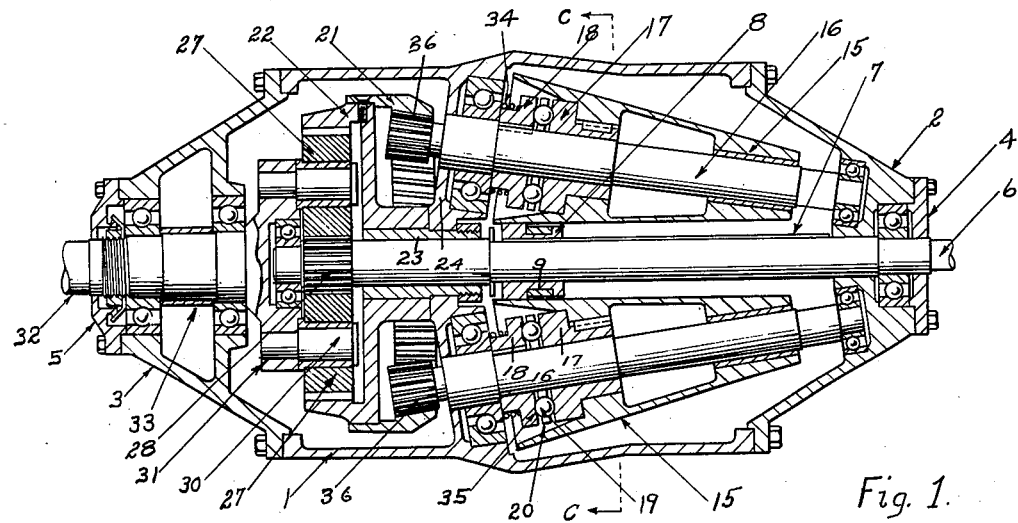
Fig. 1.
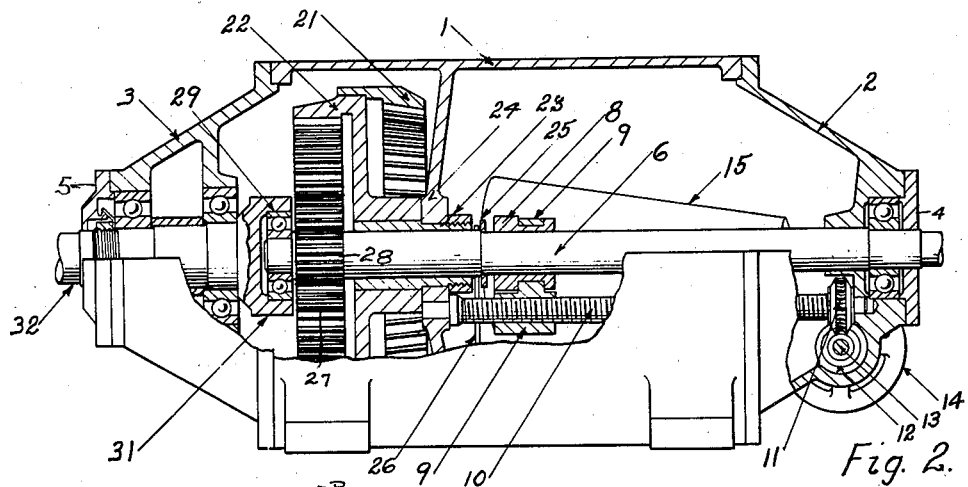
Fig. 2.
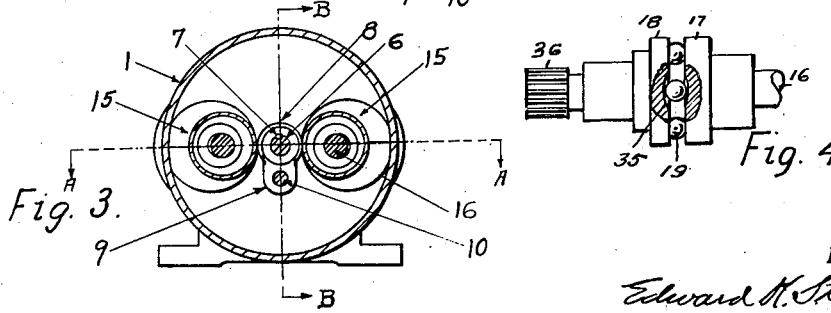
Fig. 3.
Fig. 4.
INVENTOR.
Edward K. Standish
BY
Harry R. Williams
ATTORNEY.

Patented June 10, 1930

1,762,199

UNITED STATES PATENT OFFICE

EDWARD K. STANDISH, OF HARTFORD, CONNECTICUT, ASSIGNOR TO HARTFORD SPECIAL MACHINERY COMPANY, OF HARTFORD, CONNECTICUT, A CORPORATION OF CONNECTICUT

VARIABLE-SPEED TRANSMISSION

Application filed July 3, 1929. Serial No. 375,639.

This invention relates to a variable speed transmission of the type in which the changes of speed are obtained through the medium of rolls.

The object of the invention is to provide a compact mechanism of this character which is economical to manufacture, which will transmit power efficiently without noise or vibration, which is capable of slight variations but has a wide range of increase and decrease of output speed, which may be absolutely controlled and can be instantly altered while in operation, which may be entirely enclosed so that it will be protected from dirt and can be thoroughly lubricated, and in which the driving pressures of the engaging rolling surfaces increase with the load.

In the embodiment of the invention illustrated there is a frame which may be a lubricant-proof casing with a shaft extending through each end. Either shaft may be the driving shaft and be turned in either direction by power applied by a motor, pulley or gear, the other being the driven shaft for transmitting power to the load. In the frame of casing there are a plurality of conical rolls engaged by an intermediate roll which is adjustable axially of the conical rolls for obtaining the variations in speed, and one or more of the conical rolls may have a slight axial movement so as to increase the pressure between the conical rolls and the intermediate roll according to the load resistance. The conical rolls are connected with one of the shafts through the medium of the intermediate roll, and the conical roll axles are preferably connected with the other shaft through the medium of a differential gearing, whereby the mechanism will combine the features of a sensitive variable speed and a differential transmission gear.

In the accompanying drawings Fig. 1 shows a longitudinal section of one embodiment of the mechanism on the plane indicated by the dotted line A—A on Fig. 3. Fig. 2 shows a side elevation of the same with a portion cut in section on the dotted line B—B on Fig. 3. Fig. 3 is a transverse section on smaller scale taken on the plane indicated by the dotted line C—C on Fig. 1. Fig. 4 is a detail showing means which may be employed for connecting the conical rolls with their axles and giving them a slight longitudinal movement as the power is applied.

The frame shown has a cylindrical section 1 with a tapering head 2 at one end and a tapering head 3 at the other end, which heads have end plates 4 and 5 respectively. A shaft 6 extends through the head 2, and for the purpose of simplifying the description this shaft will be termed the driving shaft although, as suggested, it could be the driven shaft.

In the form illustrated this shaft has a spline 7, and movable longitudinally along the shaft and rotatably held thereto by the spline is the intermediate roll 8. This roll has a section engaged by a yoke 9 through which passes a screw 10 that at the head end has a worm wheel 11 which is engaged by a worm 12 attached to a shaft 13 that outside of the frame is provided with a hand wheel 14. By turning this hand wheel the roll 8 may be adjusted to any desired position along the shaft 6.

Conical rolls 15 are arranged to engage with the intermediate roll 8 on diametrically opposite sides of the shaft 6. These conical rolls are rotatably mounted upon and have a slight longitudinal movement along axles 16 which are rotatably mounted obliquely with relation to the shaft 6 at such angles that the adjacent surfaces of the conical rolls which engage with the intermediate roll are parallel with each other and with the axis of the shaft.

Keyed in the larger end of each conical roll is a collar 17 that is rotatable on and is free to move longitudinally of its axle. Keyed to each axle is a similar collar 18. The adjacent faces of these collars are provided with independent curved indentations or sockets 35 and between these collars and extending into the sockets are hardened balls 19 which are retained in place by a cage 20. When this mechanism is in operation the recesses 35 in cooperation with the balls function as cams that tend to force the conical rolls endwise and thus automatically increase the engaging pressures between the conical roll surfaces and the intermediate roll so that there will be no slippage between the rolling surfaces. Springs 34 may be arranged back of the collars 18 to provide the initial pressure of the collars on the balls and thus the first contact of the conical rolls and intermediate roll. It is preferred to arrange the conical rolls on diametrically opposite sides of the intermediate roll so that the lateral forces exerted by the conical rolls will be counter-balanced and the shaft 6 relieved from transverse strain.

At the end of each conical roll axle is a pinion 36 which engages with an internal gear 21 that is fastened to an internal gear 22 which is mounted to rotate on a sleeve 23 secured in a web 24 that extends across the casing.

At the end of the shaft 6 is a pinion 28 and engaging with this pinion are gears 27 which mesh with the internal gear 22. The gears 27 are rotatably mounted on studs 30 that project from the head 31 of the shaft 32 which is supported by suitable bearings in the end of the casing.

Assuming that power is applied to the shaft 6 and there is load on the shaft 32 the intermediate roll 8 will cause the rolls 15 to rotate, and the pinion 28 will rotate the gears 27 which in turn will travel around inside the internal gear 22 with a planetary motion, causing the studs 30 and therefore the shaft 32 to rotate at a speed depending upon the speed at which the conical rolls are turning and the pinions 36 are driving the annular gears 21 and 22. As the parts start moving the cam actions of the recesses and balls between the collars tend to force the conical rolls axially and tighten their engagement with the intermediate roll. By this means the pressure between the conical rolls and the intermediate roll automatically varies with the load on the driven shaft and thus the parts will turn without slippage. By turning the hand wheel 14 and screw 10, the intermediate roll 8 may be adjusted along the shaft 6 to such position as will give the parts the desired ratios of speed for driving the particular apparatus to which the mechanism is applied.

The invention claimed is:

1. A variable speed mechanism comprising a frame, two shafts supported by the frame in axial alignment, one shaft having a fixed pinion and a cylindrical roll rotatable with and longitudinally adjustable along the shaft, and the other shaft having pinions in mesh with the first mentioned pinion, two axles rotatably supported by the frame oblique to, and on diametrically opposite sides of the former shaft, said axles having pinions at their separated ends, an internal gear in mesh with the axle pinions and the pinions carried by the latter shaft, conical rolls rotatably mounted on and movable axially along said axles with their adjacent surfaces parallel and in frictional engagement with the cylindrical roll, and camming connections between the conical rolls and their axles adapted to cause the conical rolls to move longitudinally and increase their frictional engagement with the cylindrical roll as power is applied.

2. A variable speed mechanism comprising a frame, two shafts supported by the frame in axial alignment, one shaft having a fixed pinion and a cylindrical roll rotatable with and longitudinally adjustable along the shaft, and the other shaft having pinions in mesh with the first mentioned pinion, two axles rotatably supported by the frame oblique to, and on diametrically opposite sides of the former shaft, said axles having pinions at their separated ends, an internal gear in mesh with the axle pinions and the pinions carried by the latter shaft, conical rolls rotatably mounted on and movable axially along said axles with their adjacent surfaces parallel and in frictional engagement with the cylindrical roll, and loose ball and socket connections between the conical rolls and their axles adapted to cause the conical rolls to move longitudinally and increase their frictional engagement with the cylindrical roll as power is applied.

3. A variable speed mechanism comprising a frame, two shafts supported by the frame in axial alignment, one shaft having a fixed pinion and a cylindrical roll rotatable with and longitudinally adjustable along the shaft, means extending to the outside of the frame for adjusting the cylindrical roll, and the other shaft having pinions in mesh with the first mentioned pinion, two axles rotatably supported by the frame oblique to, and on diametrically opposite sides of the former shaft, said axles having pinions at their separated ends, an internal gear in mesh with the axle pinions and the pinions carried by the latter shaft, conical rolls rotatably mounted on and movable axially along said axles with their adjacent surfaces parallel and in frictional engagement with the cylindrical roll, and camming connections between the conical rolls and their axles adapted to cause the conical rolls to move longitudinally and increase their frictional engagement with the cylindrical roll as power is applied.

4. A variable speed mechanism comprising a frame, two shafts supported by the frame in axial alignment, one shaft having a fixed pinion and a cylindrical roll rotatable with and longitudinally adjustable along the shaft, and the other shaft having pinions in mesh with the first mentioned pinion, two axles rotatably supported by the frame oblique to, and on diametrically opposite sides of the former shaft, said axles having pinions at their separated ends, an internal gear in mesh with the axle pinions, an internal gear in mesh with the pinions carried by the latter shaft, said gears being fixed together, conical rolls rotatably mounted on and movable axially along said axles with their adjacent surfaces parallel and in frictional engagement with the cylindrical roll, and camming connections between the conical rolls and their axles adapted to cause the conical rolls to move longitudinally and increase their frictional engagement with the cylindrical roll as power is applied.

EDWARD K. STANDISH.